May 12, 1959 W. G. KRELLNER 2,886,352
SHAFT SEAL
Filed Oct. 16, 1956
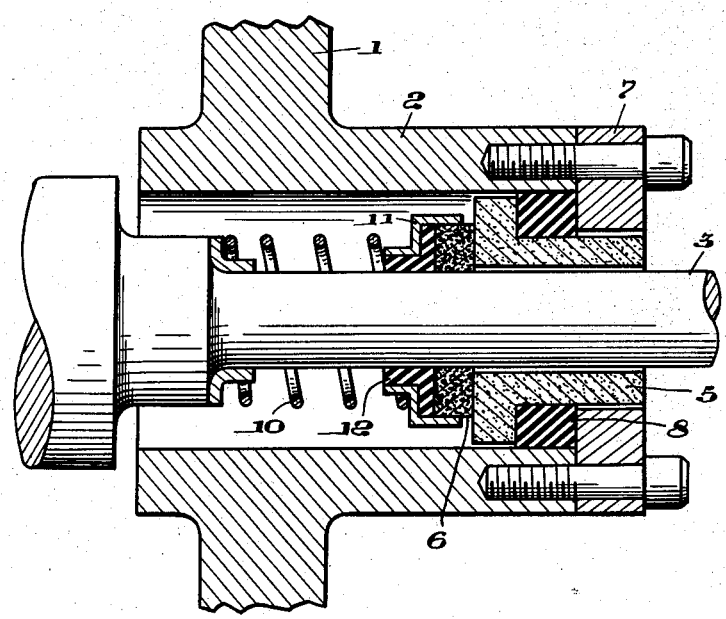
INVENTOR.
WALTER G. KRELLNER
BY
Brown, Critchlow, Flick & Peckham
ATTORNEYS.

United States Patent Office 2,886,352
Patented May 12, 1959

2,886,352

SHAFT SEAL

Walter G. Krellner, St. Marys, Pa., assignor to Stackpole Carbon Company, St. Marys, Pa., a corporation of Pennsylvania Application October 16, 1956, Serial No. 616,314

6 Claims. (Cl. 286—11.13)

This invention relates to shaft seals, and more particularly to a seal in which a rotating sealing ring engages a thrust collar.

It is common practice to seal the space between a rotating shaft and the wall of the housing through which it projects by means of a sealing ring rotating with the shaft and pressed axially against a thrust collar also encircling the shaft but supported by the housing. Generally, the sealing ring is made of graphite and the thrust collar of metal. Under normal conditions without lubrication, the coefficient of friction of the ring against the collar is about 0.2, except in those cases where excessive seizing or galling takes place. This friction increases the temperature of the seal to a point which, in many cases, may be highly undesirable. Where seizure occurs, the amount of it and the corresponding degree of wear are in part determined by the affinity of the sliding sealing surfaces for each other.

It is among the objects of this invention to provide a shaft seal in which the coefficient of friction of the sealing ring against the thrust collar is greatly reduced, in which there is a very low wear rate of the sealing ring, in which both mating elements of the seal can be molded to size and baked without harmful shrinkage, and which may be used with acids and chemicals where metal parts are not satisfactory.

The preferred embodiment of the invention is illustrated in the accompanying drawing, in which the single figure is an axial section through my shaft seal associated with a rotating shaft.

Referring to the drawing, a wall of the housing 1 is provided with an opening that may be surrounded by a cylindrical flange 2. Extending through the opening is a rotatable shaft 3, which may be driven from either end. The bearings for the shaft are not shown. As it is desired to prevent a fluid from flowing along the shaft through the housing wall, a seal is provided.

The seal includes a thrust collar 5 supported by the housing and having a radial contact face that is engaged by a radial face of a sealing ring 6 mounted on the shaft, although the positions of the ring and collar could be reversed without affecting this invention. The collar encircles the shaft and may include a cylindrical portion having at its inner end an integral flange. The collar is held in the flanged housing opening by an annular retaining member 7 bolted to the outer end of housing flange 2. A resilient packing ring 8 is inserted between this retaining member and the collar flange to provide a resilient backing for the collar and to seal the space between it and the housing.

The sealing rings 6 fits snugly around the shaft, but is slidable along it. It is pressed against the thrust collar by a coil spring 10, which engages a cup 11 that encircles part of the ring. Preferably, the cup also contains a resilient annular packing member 12 that tightly but slidably engages the shaft and forms a cushion behind the sealing ring. This packing member prevents leakage of fluid along the shaft and compels the sealing ring to rotate with the shaft, while the tightly engaging faces of the sealing ring and collar prevent fluid from passing between them.

Most suitably, the entire sealing ring is molded from carbon-bonded graphite in a well-known manner, but it is a feature of this invention that at least the portion of the thrust collar engaging the sealing ring is formed of a special material. This material is powdered aluminum oxide or silicon oxide bound together by a carbonaceous bond, such as a carbon or thermosetting resin bond. For example, the powdered oxide is mixed with from 5% to 30% by weight of the bonding material, such as pitch or a phenolic resin, depending on the fineness of the oxide powder and the strength and other physical characteristics desired in the sealing element. The material then is molded into the desired shape, a complete thrust collar being shown in the drawing as made in this way. The element then is baked in an oven. Because of the particular bond used, the shrinkage of the collar during baking can be controlled to very close tolerances impossible where a ceramic binder is used, so that in most cases machining is unnecessary.

It has been found that a graphite sealing ring sliding against a carbon bonded alumina or silica thrust collar has a coefficient of friction of only about 0.1, which is only half of the coefficient of friction that exists where the thrust collar is made of metal. Friction is reduced because aluminum and silicon oxides are not reactive with carbon at normal operating temperatures. For the same reason, seizure does not occur, so the rate of wear is reduced. The graphite sealing ring and the thrust collar just described are quite corrosion resistant, so they may be used with acids and chemicals where metal collars are not satisfactory because of chemical attack.

If a resin bond is used, the sealing element will have the same advantages as one made from carbon bonded oxide, except that it will not have the chemical and corrosion resistance of the carbon bonded material. On the other hand, the resin bonded oxide can be molded to size and manufactured more cheaply than either the carbon bonded oxide or the usual metal parts.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A shaft seal element for sliding engagement with an annular sealing member having a graphite radial contact face, said element being an annular member provided with a radial contact face formed of a particulate material selected from the group consisting of aluminum oxide and silicon oxide bound together by a carbonaceous bond.

2. A shaft seal element according to claim 1, in which said particulate material is selected from the group consisting of aluminum oxide and silicon oxide and the bond is carbon.

3. A shaft seal element according to claim 1, in which said particulate material is selected from the group consisting of aluminum oxide and silicon oxide and the bond is a thermosetting resin.

4. A shaft seal element according to claim 1, in which said particulate material consists essentially of aluminum oxide and the bond is carbon.

5. A shaft seal comprising a thrust collar, and a sealing ring adapted to be mounted on a rotatable shaft extending through the collar, the collar and ring having radial faces in sliding engagement with each other, and one of said engaging faces being formed of graphite and the other face being formed of a particulate material selected from the group consisting of aluminum oxide and silicon oxide bound together by a carbonaceous bond.

6. A shaft seal element for sliding engagement with an annular sealing member having a graphite radial contact face, said element being an annular member provided with a radial contact face formed of powdered silicon oxide and a carbon bond.

References Cited in the file of this patent

UNITED STATES PATENTS

| | | |
|---|---|---|
| 2,200,413 | Christman et al. | May 14, 1940 |
| 2,209,085 | Jensen | July 23, 1940 |
| 2,243,208 | Hawley | May 27, 1941 |
| 2,571,526 | Bonnet | Oct. 16, 1951 |
| 2,645,508 | Payne | July 14, 1953 |
| 2,785,913 | Solari | Mar. 19, 1957 |